United States Patent
Stevenson

(10) Patent No.: US 7,059,995 B2
(45) Date of Patent: Jun. 13, 2006

(54) SEVEN- OR EIGHT-SPEED TRANSMISSION

(75) Inventor: Paul D. Stevenson, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 143 days.

(21) Appl. No.: 10/784,555

(22) Filed: Feb. 23, 2004

(65) Prior Publication Data

US 2004/0266581 A1    Dec. 30, 2004

Related U.S. Application Data

(60) Provisional application No. 60/480,877, filed on Jun. 24, 2003.

(51) Int. Cl.
  *F16H 3/44*    (2006.01)

(52) U.S. Cl. .................................................... 475/284

(58) Field of Classification Search ................ 475/275, 475/284, 313, 325, 262, 286

See application file for complete search history.

(56) References Cited

U.S. PATENT DOCUMENTS

| | | | |
|---|---|---|---|
| 4,070,927 A | 1/1978 | Polak | 74/765 |
| 4,709,594 A | 12/1987 | Maeda | 74/753 |
| 5,106,352 A | 4/1992 | Lepelletier | 475/280 |
| 5,599,251 A | 2/1997 | Beim et al. | 475/275 |
| 6,053,839 A | 4/2000 | Baldwin et al. | 475/281 |
| 6,071,208 A | 6/2000 | Koivunen | 475/275 |
| 6,083,135 A | 7/2000 | Baldwin et al. | 475/276 |
| 6,139,463 A * | 10/2000 | Kasuya et al. | 475/275 |
| 6,558,287 B1 | 5/2003 | Hayabuchi et al. | 475/271 |
| 6,811,513 B1* | 11/2004 | Filanovsky et al. | 475/284 |
| 6,827,664 B1* | 12/2004 | Stevenson et al. | 475/275 |
| 2002/0065164 A1* | 5/2002 | Kato et al. | 475/285 |

* cited by examiner

*Primary Examiner*—Roger Pang
(74) *Attorney, Agent, or Firm*—Christopher DeVries

(57) ABSTRACT

A multi-speed transmission includes an input shaft, an output shaft, and three planetary gear sets. The ring gear of the second planetary gear set is integral with the ring gear of the first planetary gear set, and the carrier of the second planetary gear set is continuously connected with the carrier of the first planetary gear set. Six torque-transmitting mechanisms are engaged in combinations of two to establish at least seven forward speed ratios and a reverse speed ratio between the input shaft and the output shaft.

8 Claims, 3 Drawing Sheets

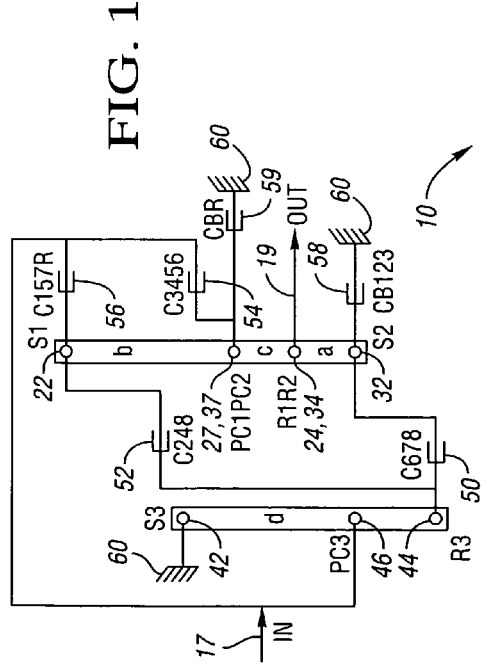
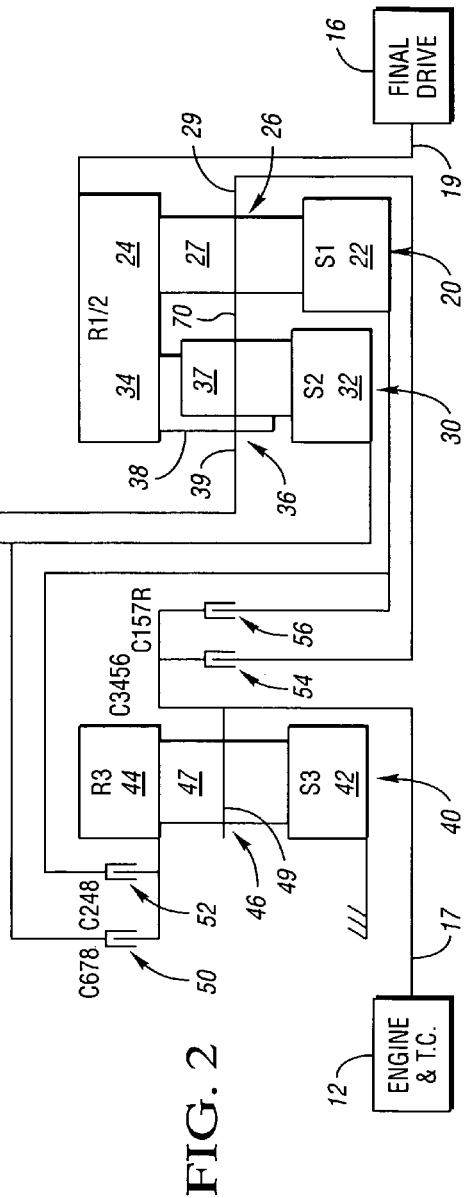
FIG. 1
FIG. 2

FIG. 3

| GEAR STATE | GEAR RATIO | RATIO STEPS | CLUTCHING ELEMENTS (NAME/TYPE/GEAR NODE CONNECTION) | | | | | |
|---|---|---|---|---|---|---|---|---|
| | | | C678 (50) CLUTCH S2(32) R3(44) | C248 (52) CLUTCH R3(44) S1(22) | C3456 (54) CLUTCH PC3(46) PC2(36) | C157R (56) CLUTCH PC3(46) S1(22) | CB123 (58) CLUTCH S2(32) GROUND | CBR (59) CLUTCH PC2(36) GROUND |
| Rev | -2.63 | | | | | X | | G |
| N | | | | | | | G | |
| 1st | 4.630 | -0.57 | | X | | | X | |
| 2nd | 2.849 | 1.63 | | | X | X | | |
| 3rd | 2.000 | 1.42 | | X | X | | | |
| 4th | 1.312 | 1.52 | | | X | X | | |
| 5th | 1.000 | 1.31 | X | | X | | | |
| 6th | 0.762 | 1.31 | X | | | X | | |
| 7th | 0.671 | 1.14 | X | | | X | | |
| 8th | 0.615 | 1.09 | X | X | | | | |

OVERALL RATIO: 7.52

SEVEN- OR EIGHT-SPEED TRANSMISSION

CROSS-REFERENCE TO RELATED APPLICATION

This application claims the benefit of U.S. Provisional Application 60/480,877, filed Jun. 24, 2003, which is hereby incorporated by reference in its entirety.

TECHNICAL FIELD

The present invention relates to a transmission having three planetary gear sets that are controlled by six torque-transmitting devices to provide at least seven forward speed ratios and at least one reverse speed ratio.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had planetary gear sets with two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, multi-speed manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to six or more. Six-speed transmissions are disclosed in U.S. Pat. No. 4,070,927 issued to Polak on Jan. 31, 1978; U.S. Pat. No. 6,071,208 issued to Koivunen on Jun. 6, 2000; U.S. Pat. No. 5,106,352 issued to Lepelletier on Apr. 21, 1992; U.S. Pat. No. 5,599,251 issued to Beim and McCarrick on Feb. 4, 1997; and U.S. Pat. No. 6,422,969 issued to Raghavan and Usoro on Jul. 23, 2002.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five or six-speed devices due to the size and complexity of these transmissions.

Seven-speed transmissions are disclosed in U.S. Pat. No. 4,709,594 issued to Maeda; U.S. Pat. No. 6,053,839 issued to Baldwin et al.; U.S. Pat. No. 6,083,135 issued to Baldwin et al.; and U.S. Pat. No. 6,623,397 issued to Raghavan, Bucknor and Usoro. Eight-speed transmissions are disclosed in U.S. Pat. No. 6,375,592 issued to Takahashi et al.; U.S. Pat. No. 6,425,841 issued to Haka; U.S. Pat. No. 6,471,615 issued to Naraki et al.; and U.S. Pat. No. 6,558,287 issued to Hayabuchi et al. The Haka and Hayabuchi transmissions utilize three planetary gear sets and six torque-transmitting devices, including two brakes and two clutches, to provide eight forward speed ratios and a reverse speed ratio. One of the planetary gear sets is positioned and operated to establish two fixed speed input members for the remaining two planetary gear sets. The Haka transmission requires two double-transition shifts and the Hayabuchi transmission offers low overall ratio spread for an eight-speed transmission. The Takahashi and Naraki transmissions employ a complex arrangement of multiple planetary gear sets, multiple countershaft gear sets and multiple torque-transmitting devices (clutches, brakes and freewheelers) to provide eight forward speed ratios and a reverse speed ratio. Seven- and eight-speed transmissions provide further improvements in acceleration and fuel economy over six-speed transmissions. However, like the six-speed transmissions discussed above, the development of seven- and eight-speed transmissions has been precluded because of complexity, size and cost.

SUMMARY OF THE INVENTION

The invention provides a multi-speed transmission including three planetary gear sets and six torque-transmitting mechanisms which are engageable in combinations to provide at least seven forward speed ratios and a reverse speed ratio.

The transmission includes an input shaft, an output shaft, and a planetary gear arrangement having first, second and third planetary gear sets. Each planetary gear set includes a ring gear, sun gear and carrier. The input shaft is continuously connected with the carrier of the third planetary gear set, and the output shaft is continuously connected with the ring gear of the first planetary gear set.

The ring gear of the second planetary gear set is integrally connected with the ring gear of the first planetary gear set, and the carrier of the second planetary gear set is continuously connected with the carrier of the first planetary gear set. The second planetary gear set is a compound planetary gear set, and the first and third planetary gear sets are simple planetary gear sets.

A first clutch selectively connects the ring gear of the third planetary gear set with the sun gear of the second planetary gear set. A second clutch selectively connects the ring gear of the third planetary gear set with the sun gear of the first planetary gear set. A third clutch selectively connects the carrier of the third planetary gear set with the carrier of the first planetary gear set. A fourth clutch selectively connects the carrier of the third planetary gear set with the sun gear of the first planetary gear set.

A first brake selectively connects a transmission housing with the sun gear of the second planetary gear set. A second brake selectively connects the transmission housing with the carrier of the second planetary gear set.

The first, second, third and fourth clutches, and first and second brakes are engaged in combinations of two to establish at least seven forward speed ratios and a reverse speed ratio between the input shaft and the output shaft. This configuration may further establish an eighth forward speed ratio.

Preferably, the ring gear of the second planetary gear set is integrally connected with the ring gear of the first planetary gear set by a sleeve, and a spacer and spring member are positioned between the ring gear of the second planetary gear set and the ring gear of the first planetary gear set. The ring gear of the second planetary gear set and the ring gear of the first planetary gear set are splined to the sleeve.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

FIG. 1 shows a lever diagram of a transmission in accordance with the invention;

FIG. 2 shows a stick diagram corresponding with the lever diagram of FIG. 1;

FIG. 3 shows a truth table corresponding with the diagrams of FIGS. 1 and 2.

DESCRIPTION OF THE PREFERRED EMBODIMENTS

Figure 4:
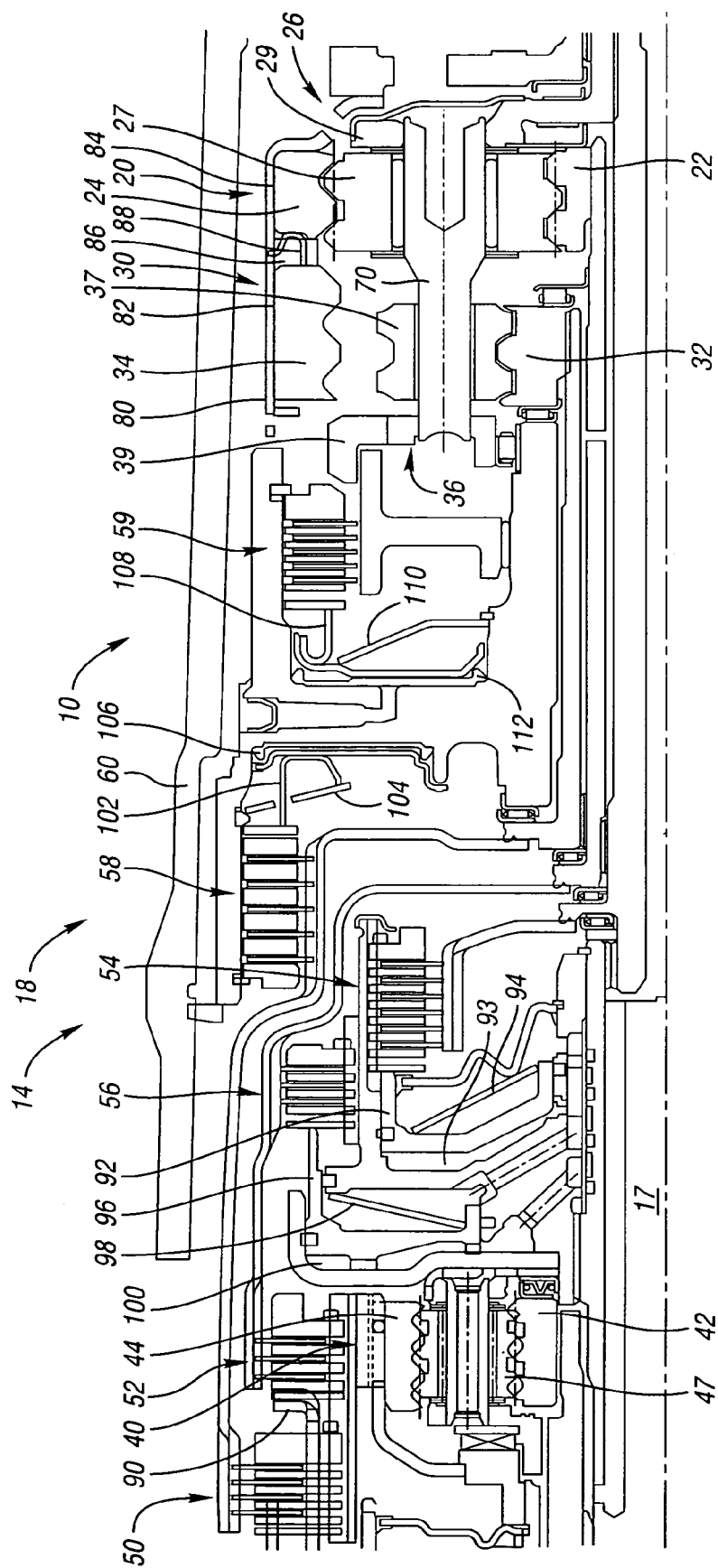
FIG. 4 shows a partial longitudinal cross-sectional view of a transmission corresponding with FIGS. 1–3.

FIG. 1 shows a lever diagram which is representative of a transmission in accordance with the invention, and corresponds with the stick diagram of FIG. 2. In FIG. 1, like reference numerals are used to refer to like components from FIG. 2.

Referring specifically to the stick diagram of FIG. 2, a powertrain 10 of the present invention includes a conventional engine and torque converter 12, a planetary transmission 14, and a conventional final drive mechanism 16.

The planetary transmission 14 includes an input shaft 17 continuously connected with the engine and torque converter 12, a planetary gear arrangement 18, and an output shaft 19 continuously connected with the final drive mechanism 16. The planetary gear arrangement 18 includes three planetary gear sets 20, 30 and 40 (viewed from right to left in FIG. 2).

The planetary gear set 20 (the first planetary gear set) includes a sun gear member 22, a ring gear member 24, and a planet carrier assembly member 26. The planet carrier assembly includes a plurality of pinion gears 27 rotatably mounted on a carrier member 29 and disposed in meshing relationship with both the sun gear member 22 and the ring gear member 24. The planetary gear set 20 is a simple planetary gear set.

The planetary gear set 30 (the second planetary gear set) includes a sun gear member 32, a ring gear member 34, and a planet carrier assembly member 36. The planet carrier assembly member 36 includes a plurality of pinion gears 37, 38 rotatably mounted on a carrier member 39. The planetary gear set 30 is a compound planetary gear set. The pinion gears 37 are in meshing relationship with the sun gear member 32, and the pinion gears 38 are in meshing relationship with the ring gear member 34.

As illustrated in FIG. 2, the ring gear member 34 is integrally connected with the ring gear member 24. In other words, the ring gear members 24, 34 are formed by a single, elongated ring gear, or they are integrally joined together in some manner (such as that described below with reference to FIG. 4).

The planetary gear set 40 (the third planetary gear set) includes a sun gear member 42, a ring member 44, and a planet carrier assembly member 46. The planet carrier assembly member 46 includes a plurality of pinion gears 47 rotatably mounted on a carrier member 49 and disposed in meshing relationship with both the sun gear member 42, and the ring gear member 44.

The planetary gear arrangement 18 also includes four rotating clutches 50, 52, 54, 56, and two brakes 58, 59.

The input shaft 17 is continuously connected with the planet carrier assembly member 46, and the output shaft 19 is continuously connected with the ring gear members 24, 34. An interconnecting member 70 continuously interconnects the planet carrier assembly member 26 with the planet carrier assembly member 36.

The ring gear member 44 is selectively connectable with the sun gear member 32 through the clutch 50. The ring gear member 44 is selectively connectable with the sun gear member 22 through the clutch 52. The planet carrier assembly member 46 is selectively connectable with the planet carrier assembly member 26 through the clutch 54. The planet carrier assembly member 46 is selectively connectable with the sun gear member 22 through the clutch 56. The sun gear member 32 is selectively connectable with the transmission housing 60 through the brake 58. The carrier 36 is selectively connectable with the transmission housing 60 through the brake 59.

As shown in the truth table of FIG. 3, the torque-transmitting mechanisms 50, 52, 54, 56, 58, 59 are selectively engaged in combinations of two to provide seven or eight forward speed ratios and one reverse speed ratio.

To establish the reverse speed ratio, the clutch 56 and brake 59 are engaged. Accordingly, the planet carrier assembly member 46 and input shaft 17 are connected with the sun gear member 22, and the planet carrier assembly members 26, 36 are connected to the transmission housing 60. The overall numerical value of the reverse speed ratio is −2.63, as illustrated in the truth table of FIG. 3.

The first forward speed ratio is established with the engagement of the clutch 56 and the brake 58. The clutch 56 connects the input shaft 17 and carrier 46 to the sun gear member 22, and the brake 58 connects the sun gear member 32 to the transmission housing 60. The numerical value of the first forward speed ratio is determined by the tooth ratios of the planetary gear sets 20, 30. This value is 4.630, as indicated by the truth table.

The second forward speed ratio is established with the engagement of the clutch 52 and brake 58. The clutch 52 connects the ring gear member 44 with the sun gear member 22, and the brake 58 connects the sun gear member 32 with the transmission housing 60. The numerical value of the second forward speed ratio is 2.849.

The third forward speed-ratio is established with the engagement of the clutch 54 and brake 58. The clutch 54 connects the input shaft 17 and planet carrier assembly member 46 to the planet carrier assembly member 26, and the brake 58 connects the sun gear 32 to the transmission housing 60. The numerical value of the third forward speed ratio is 2.000.

The fourth forward speed ratio is established with the engagement of the clutches 52, 54. The clutch 52 connects the ring gear member 44 to the sun gear member 22, and the clutch 54 connects the input shaft 17 and planet carrier assembly member 46 to the planet carrier assembly member 26. The numerical value of the fourth forward speed ratio is 1.312.

The fifth forward speed ratio is established with the engagement of the clutches 54, 56. The clutch 54 connects the input shaft 17 and planet carrier assembly member 46 to the planet carrier assembly member 26, and the clutch 56 connects the input shaft 17 and planet carrier assembly member 46 to the sun gear member 22. In this configuration, the input shaft is directly connected to the output shaft, and the overall gear ratio is 1.000.

The sixth forward speed ratio is established with the engagement of the clutches 50, 54. The clutch 50 connects the ring gear member 44 with the sun gear member 32. The clutch 54 connects the input shaft 17 and planet carrier assembly member 46 to the planet carrier assembly member 26. The numerical value of the sixth forward speed ratio is 0.762.

The seventh forward speed ratio is established with the engagement of the clutches 50, 56. The clutch 50 connects the ring gear member 44 with the sun gear member 32, and the clutch 56 connects the input shaft 17 and the planet carrier assembly member 46 with the sun gear member 22. The numerical value of the seventh forward speed ratio is 0.671.

The eighth forward speed ratio is established with the engagement of the clutches 50, 52. The clutch 50 connects the ring gear member 44 with the sun gear member 32, and the clutch 52 connects the ring gear member 44 with the sun gear member 22. The numerical value of the eighth forward speed ratio is 0.615.

As set forth above, the engagement schedules for the torque-transmitting mechanisms are shown in the truth table of FIG. 3. This truth table also provides an example of speed ratios that are available utilizing preferred ring gear/sun gear tooth ratios. The tooth ratio of the planetary gear set 20 (R1/S1) is preferably 2.63; the tooth ratio of the planetary gear set 30 (R2/S2) is preferably 2.00; and the tooth ratio of the planetary gear set 40 (R3/S3) is preferably 1.60. The truth table of FIG. 3 also describes the ratio steps that are attained utilizing the sample tooth ratios given. For example, the step ratio between the first and second forward ratios is 1.63, while the step ratio between the reverse and first forward ratio is –0.57. It can also readily be determined from the truth table of FIG. 3 that all of the single step forward ratio interchanges are of the single transition variety, as are the double step forward ratio interchanges.

FIG. 4 shows a partial longitudinal cross-sectional view of a transmission embodying the components described above with reference to FIGS. 1 and 2. Like components are used in FIG. 4 to reference such components in FIGS. 1 and 2. Specifically, FIG. 4 shows the layout of the three planetary gear sets 20, 30 and 40, as well as the six torque-transmitting mechanisms 50, 52, 54, 56, 58 and 59.

The clutch 52 is applied by the castellated piston member 90. The clutch 54 is applied by the piston member 92 when fluid is forced into the apply chamber 93 to move the piston member 92 against the force of the return spring 94. The clutch 56 is applied by the piston member 96 against the force of the return spring 98 when fluid is forced into the apply chamber 100. The brake 58 is applied by the piston member 102 against the force of the return spring 104 when fluid is forced into the apply chamber 106. The brake 59 is applied by the piston member 108 against the force of the return spring 110 when fluid is forced into the apply chamber 112.

FIG. 4 also illustrates how the ring gear 24 is integrally connected with the ring gear 34. The ring gears 24, 34 are splined to the sleeve 80 by the splines 82, 84. A spacer 86 and spring member 88 are also positioned between the ring gears 24, 34 to maintain separation of the ring gears 24, 34.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
an input shaft;
an output shaft;
a planetary gear arrangement having first, second and third planetary gear sets, each planetary gear set having a ring gear, sun gear and carrier;
said input shaft being continuously interconnected with said carrier of the third planetary gear set, said output shaft being continuously interconnected with said ring gear of the first planetary gear set;
said ring gear of the second planetary gear set being integrally connected with said ring gear of the first planetary gear set, and said carrier of the second planetary gear set being continuously connected with said carrier of the first planetary gear set;
said second planetary gear set being a compound planetary gear set with pinion gears, and said first and third planetary gear sets being simple planetary gear sets with pinion gears, wherein said pinion gears of said simple and compound planetary gear sets are separate from each other such that no pinion is shared by said simple and compound planetary gear sets;
a first clutch selectively interconnecting said ring gear of the third planetary gear set with said sun gear of the second planetary gear set;
a second clutch selectively interconnecting said ring gear of the third planetary gear set with said sun gear of the first planetary gear set;
a third clutch selectively interconnecting said carrier of the third planetary gear set with said carrier of the first planetary gear set;
a fourth clutch selectively interconnecting said carrier of the third planetary gear set with said sun gear of the first planetary gear set;
a first brake selectively interconnecting said sun gear of the second planetary gear set with a transmission housing;
a second brake selectively interconnecting said carrier of the second planetary gear set with said transmission housing; and
said first, second, third and fourth clutches, and first and second brakes being engaged in combinations of two to establish at least seven forward speed ratios and a reverse speed ratio between said input shaft and said output shaft.

2. The multi-speed transmission of claim 1, wherein said first, second, third and fourth clutches, and first and second brakes are engaged in combinations of two to establish eight forward speed ratios and a reverse speed ratio between said input shaft and said output shaft.

3. The multi-speed transmission of claim 1, wherein said ring gear of the second planetary gear set is integrally connected with said ring gear of the first planetary gear set by a sleeve, and a spacer is positioned between said ring gear of the second planetary gear set and said ring gear of the first planetary gear set.

4. The multi-speed transmission of claim 3, wherein said ring gear of the second planetary gear set and said ring gear of the first planetary gear set are splined to said sleeve.

5. The multi-speed transmission of claim 4, further comprising a spring member positioned between said ring gear of the second planetary gear set and said ring gear of the first planetary gear set.

6. A multi-speed transmission comprising:
an input shaft;
an output shaft;

a planetary gear arrangement having first, second and third planetary gear sets, each planetary gear set having a ring gear, sun gear and carrier;

said input shaft being continuously interconnected with said carrier of the third planetary gear set, said output shaft being continuously interconnected with said ring gear of the first planetary gear set;

wherein said ring gear of the second planetary gear set is integrally connected with said ring gear of the first planetary gear set by a sleeve; and wherein a spacer is positioned between said ring gear of the second planetary gear set and said ring gear of the first planetary gear set;

said carrier of the second planetary gear set being continuously connected with said carrier of the first planetary gear set;

said second planetary gear set being a compound planetary gear set, and said first and third planetary gear sets being simple planetary gear sets;

first clutch selectively interconnecting said ring gear of the third planetary gear set with said sun gear of the second planetary gear set;

a second clutch selectively interconnecting said ring gear of the third planetary gear set with said sun gear of the first planetary gear set;

a third clutch selectively interconnecting said carrier of the third planetary gear set with said carrier of the first planetary gear set;

a fourth clutch selectively interconnecting said carrier of the third planetary gear set with said sun gear of the first planetary gear set;

a first brake selectively interconnecting a transmission housing with said sun gear of the second planetary gear set;

a second brake selectively interconnecting said transmission housing with said carrier of the second planetary gear set; and said first, second, third and fourth clutches, and first and second brakes being engaged in combinations of two to establish at least seven forward speed ratios and a reverse speed ratio between said input shaft and said output shaft.

7. A multi-speed transmission comprising:
an input shaft;
an output shaft;
a planetary gear arrangement having first, second and third planetary gear sets, each planetary gear set having a first, second and third members;

said input shaft being continuously interconnected with said second member of the third planetary gear set, said output shaft being continuously interconnected wit said first member of the first planetary gear set;

said first member of the second planetary gear set being integral with said first member of the first planetary gear set, each said first member being a ring gear;

said second member of the second planetary gear set being continuously connected with said second member of the first planetary gear set;

said second planetary gear set being a compound planetary gear set with pinion gears, and said first and third planetary gear sets being simple planetary gear sets with pinion gears, wherein said pinion gears of said simple and compound planetary gear sets are separate from each other such that no pinion is shared by said simple and compound planetary gear sets;

a first clutch selectively interconnecting said first member of the third planetary gear set with said third member of the second planetary gear set;

a second clutch selectively interconnecting said first member of the third planetary gear set with said third member of the first planetary gear set;

a third clutch selectively interconnecting said second member of the third planetary gear set with said second member of the first planetary gear set;

a fourth clutch selectively interconnecting said second member of the third planetary gear set with said third member of the first planetary gear set;

a first brake selectively interconnecting a transmission housing with said third member of the second planetary gear set;

a second brake selectively interconnecting said transmission housing with said second member of the second planetary gear set; and said first, second, third and fourth clutches, and first and second brakes being engaged in combinations of two to establish at least seven forward speed ratios and a reverse speed ratio between said input shaft and said output shaft.

8. The multi-speed transmission of claim 7, wherein said first, second, third and fourth clutches, and first and second brakes are engaged in combinations of two to establish eight forward speed ratios and a reverse speed ratio between said input shaft and said output shaft.

* * * * *